Sept. 28, 1937.  C. B. HORSLEY ET AL  2,094,103
ROENTGEN RAY CONTROL UNIT
Filed Oct. 12, 1935  4 Sheets-Sheet 1
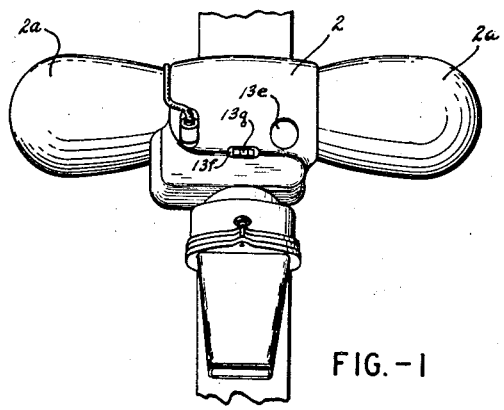
FIG.-1
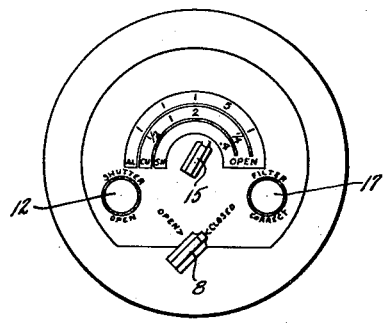
FIG.-6
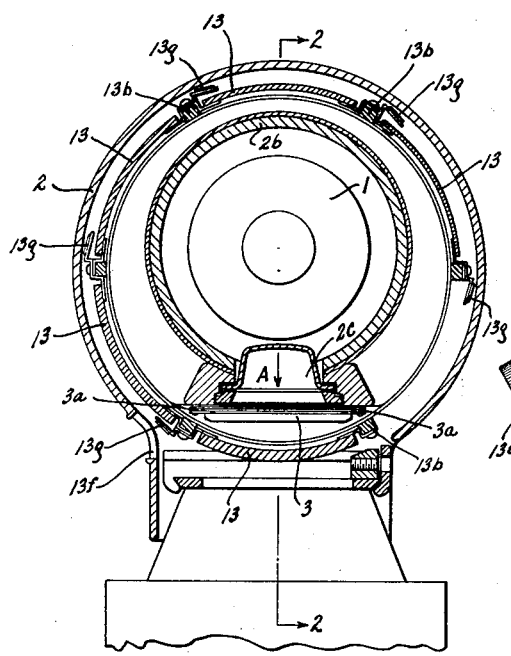
FIG.-3
FIG.-4
INVENTORS
CAPERTON B. HORSLEY &
EDWIN R. GOLDFIELD
BY
Brockett, Hyde, Higley + Meyer
ATTORNEYS Sept. 28, 1937.                C. B. HORSLEY ET AL                2,094,103
                            ROENTGEN RAY CONTROL UNIT
                            Filed Oct. 12, 1935        4 Sheets-Sheet 2

INVENTOR
CAPERTON B. HORSLEY &
EDWIN R. GOLDFIELD
BY
ATTORNEYS

Sept. 28, 1937.  C. B. HORSLEY ET AL  2,094,103
ROENTGEN RAY CONTROL UNIT
Filed Oct. 12, 1935  4 Sheets-Sheet 3

INVENTORS
CAPERTON B. HORSLEY &
EDWIN R. GOLDFIELD
BY
ATTORNEYS

Sept. 28, 1937.    C. B. HORSLEY ET AL    2,094,103
ROENTGEN RAY CONTROL UNIT
Filed Oct. 12, 1935    4 Sheets-Sheet 4
FIG.—11
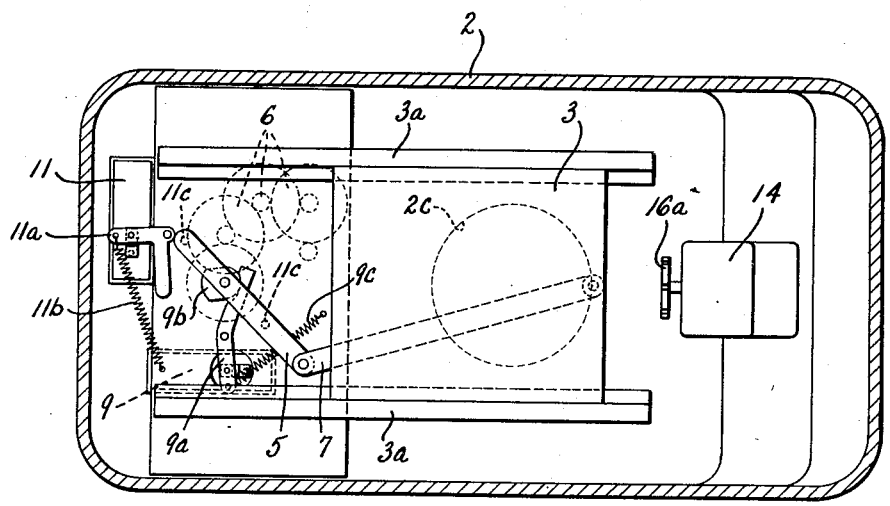
FIG.—12
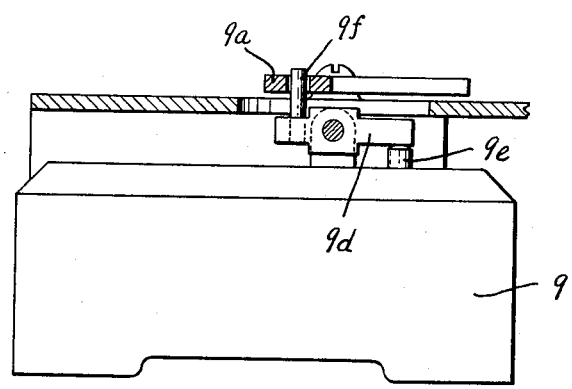
INVENTOR
CAPERTON B. HORSLEY &
EDWIN R. GOLDFIELD
BY
Brockett, Hyde, Higley + Meyer
ATTORNEYS Patented Sept. 28, 1937

2,094,103

UNITED STATES PATENT OFFICE

2,094,103

ROENTGEN RAY CONTROL UNIT

Caperton B. Horsley, Gates Mills, and Edwin R. Goldfield, University Heights, Ohio, assignors, by mesne assignments to Picker X-Ray Corporation Waite Manufacturing Division, Inc., Cleveland, Ohio, a corporation of Ohio Application October 12, 1935, Serial No. 44,748

10 Claims. (Cl. 250—34)

This invention relates to means providing for Roentgen ray control in therapy applications and the like; and the invention contemplates an X-ray tube or equivalent means arranged to produce a beam of X-rays.

An object of the invention is to provide a shutter for intercepting the beam whereby the beam may be brought up to the desired standard before any exposure of the patient, so that the exposure may be of constant qualities throughout its duration. Another object is to provide a remote control for the shutter, as by an operator in a room removed or otherwise having insulation from that enclosing the patient and the principal or X-ray-producing parts of the apparatus. The invention also includes improved mounting and actuating means for the shutter, and means for signalling to the remotely located operator the instant position of the shutter, as will hereinafter appear.

Another object of the invention is to provide a set of filter elements which may be selectively positioned to impart desired qualities to the X-ray beam, provide an improved arrangement and actuating means for the filter elements and to provide means whereby the operator either at the X-ray apparatus or at his shutter control location, may identify that filter of the set which is in operative position.

A further object is to prevent energization of the X-ray tube except when the desired filter element is in place.

The invention includes a novel relation between filters and shutter, combining compactness with accessibility.

Figure 2:
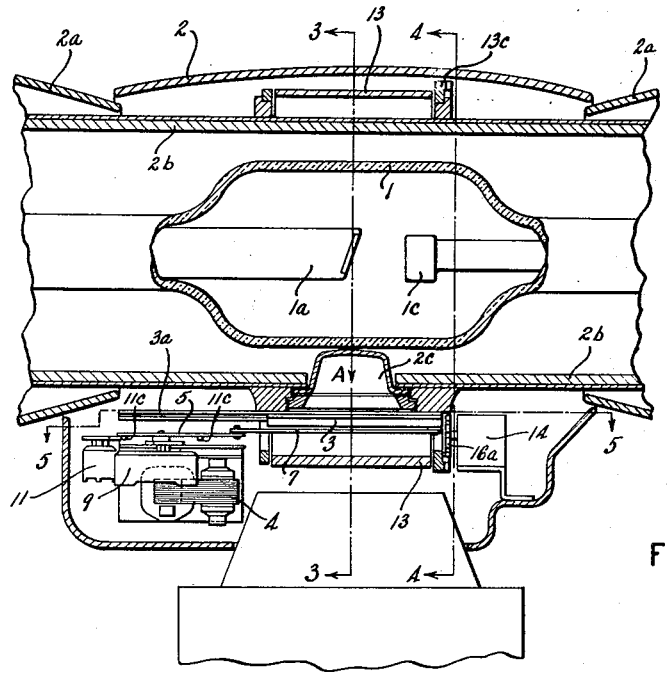
Figure 5:
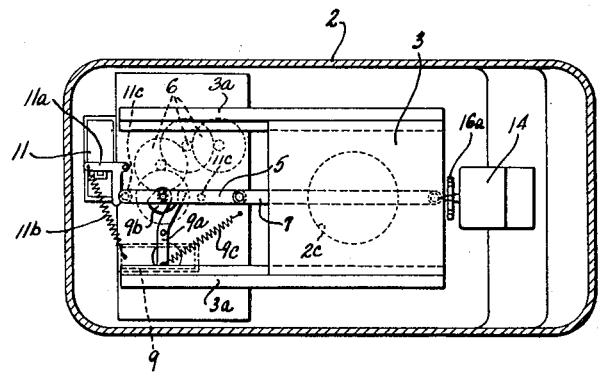
Figure 7:
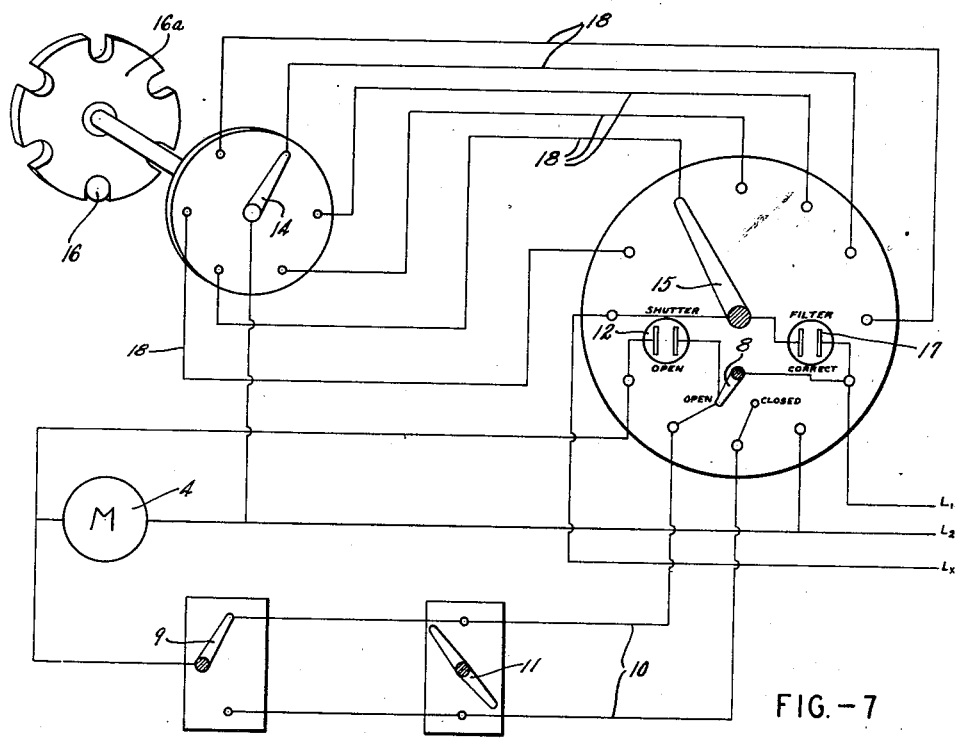
Figures 8, 9:
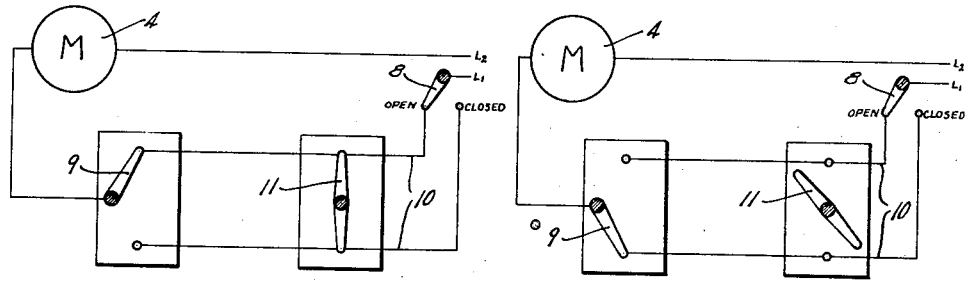
Figure 10:
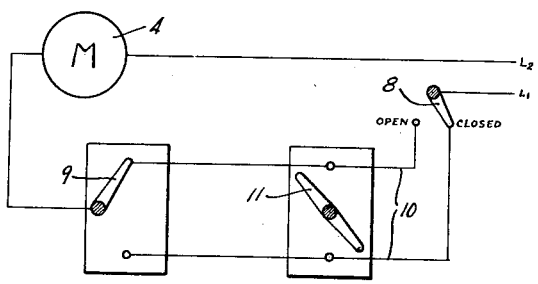

The exact nature of this invention together with further objects and advantages thereof will be apparent from the following description taken in connection with the accompanying drawings, in which Fig. 1 is an external view of the X-ray tube housing and immediately associated parts as viewed generally from in front; Fig. 2 is a typical longitudinal section, illustrating the X-ray-emitting parts of the tube and adjacent parts pertinent to the invention; Fig. 3 is a transverse section of the parts in the general plane of the X-ray beam, as in the plane of line 3—3, Fig. 2; Fig. 4 is a transverse section in the plane of line 4—4, Fig. 2; Fig. 5 is a section as in the plane of line 5—5, Fig. 2, showing details of construction; Fig. 6 is a view showing the face of the remote control unit; Fig. 7 is a diagrammatic view showing the general relation of the control parts; Figs. 8, 9, and 10 are diagrammatic views showing shutter control parts in three characteristic positions, respectively; Fig. 11 is an enlarged view corresponding to Fig. 5 but showing the mechanism in a different position; and Fig. 12 is a further enlarged conventionalized view more particularly illustrating one of the switches.

With reference now to the drawings, 1 is an X-ray tube having an anode 1a and cathode 1c. The tube is enclosed in a housing having a central part 2 movable about the tube axis relative to a pair of housing end parts 2a. The tube is mounted for movement with the central part 2 of the housing, being in fixed relation with the latter. The housing is provided with insulation impervious to X-ray radiation, as at 2b, about the tube, and having a window as at 2c of transparent plastic material and suitably disposed with reference to the anode 1a so that the effective emission from the tube is in the nature of a beam somewhat divergent but generally in the direction of the arrow A, through the window 2c—all as will be apparent to one familiar with the art.

In order that the tube may be brought to a desired standard of emission before exposure to the beam A is effected, a shutter 3 of lead or like material impervious to X-rays, is mounted for adjustment longitudinal of the tube as along a pair of ways 3a, between a closed position in front of the window 2c as indicated in Figs. 2 and 5, and an adjacent open position out of the path of the beam A.

For adjustment of the shutter 3 between open and closed positions, a motor generally indicated at 4 is provided and arranged to drive a crank 5 counter-clockwise, Figs. 5 and 11, through a suitable train of reducing gears generally indicated at 6. A link 7 connects the crank 5 with the shutter 3, and, the motor 4, crank 5 and intermediate gears 6 being preferably located to be adjacent the shutter as indicated in Figs. 2, 5 and 11, the link 7 has connection with the far end of the shutter as shown. The parts being suitably proportioned for the purpose, and particularly the throw of the crank 5 being of proper length, it will be apparent that unidirectional rotation of the crank will effect reciprocating adjustment of the shutter between open and closed positions.

A control unit such as shown in Fig. 6, is provided for the motor 4 and consequently for the shutter 3, the unit being disposed at a remote location and having circuit connections with the motor 4 as indicated in Figs. 7 to 10. These circuit connections include a two-point operator-operable switch 8 at the control unit, a two-point automatic switch 9 adjacent the crank 5, a pair of branches 10 interconnecting the points on the switches 8 and 9, and a third switch 11 adjacent the crank 5 and arranged to control connection between the branches 10 as will appear.

The switches 9 and 11 are preferably of micro-contact type, and may be as illustrated in Fig. 12 wherein the switch 9 is conventionally shown. With reference thereto, the switch proper is enclosed within a housing designated 9, and controlled by a plunger 9e operable by a rocker 9d mounted upon the housing and carrying a pin 9f. This pin 9f extends through an opening in the actuating lever 9a in which the pin has a loose fit; so that shifting of the lever, laterally in Fig. 12, will throw the rocker 9d and thereby the switch itself. Otherwise the switches 9 and 11 may be of standard commercial construction, which, however, forms no part of this invention; it being sufficient herein that means are provided for automatic timed operation of these switches, as will be described.

The general arrangement of the two switches 8 and 9 in the motor circuit, is such that regardless of the adjusted position of the shutter 3, the motor may be started by manipulation of the switch 8 and stopped by the switch 9. Automatic actuation of the switch 9 is provided by a lever 9a, disposed to actuate the switch and controlled by a cam 9b on the shaft of the crank 5 and a spring 9c, the arrangement being such that the switch 9 will be thrown from one point to the other after actuation of the motor 4 to move the shutter 3 to open or closed position—or in other words upon completion of an adjusting stroke of the shutter. In the drawings the position of the switch 9 is the same in Fig. 5 as in Figs. 7, 8, and 10, and in Figs. 9 and 11 this switch is in its other position.

The third switch 11 is also automatically operated responsive to the position of the shutter 3. It is suitably arranged to be controlled by a bellcrank 11a, which has actuation by a spring 11b and a pair of actuator cam pins 11c on the crank 5, the arrangement being such that the switch 11 will be open when the shutter is in either of its extreme positions but will be closed to interconnect the branches 10 when the shutter is in intermediate positions. In the drawings the switch 11 is in open position in Fig. 5 and in closed position in Fig. 11.

Commencing with the parts as in Figs. 2, 5, and 6, the shutter being closed, to open the shutter the operator throws the switch 8 to open position. Fig. 7 shows the circuit arrangement under such conditions, the switch 8 having just been thrown from shutter-closed to shutter-open position. The motor 4 is energized by a circuit including line $L_1$, switch 8, the upper circuit branch 10 (Figs. 7 to 10), switch 9, motor 4, to the line $L_2$. The motor thus energized actuates the crank 5 counter-clockwise in Figs. 5 and 11, through the train of gears 6, the crank 5 acting upon the link 7 to draw the shutter toward open position along the ways 3a. As the shutter starts its opening movement, the near pin 11c on the crank 5 moves from the bellcrank 11a, the lever is moved by its spring 11b and the switch 11 closes, the parts being now in the position of Fig. 8, the branch lines 10 being interconnected by the switch 11.

As the shutter attains the end of its opening stroke, the switch 9 is automatically thrown by the lever 9a actuated by the cam 9b. Also the second cam 11c re-engages the bellcrank 11a and opens the switch 11, the parts being now as shown Fig. 9. Thus the motor is de-energized by opening of the circuit between the switches 8 and 9, and the shutter has been moved to open position corresponding to the position to which the operator moved his shutter control switch 8.

To close the shutter, the operator throws his switch 8 back to closed position, which reestablishes the motor circuit by way of the lower branch connection 10. The motor operates in the same direction as before but the shutter is now moved towards closed position by the link 7. During the closing movement of the shutter the switch 11 is automatically closed as before and as the shutter attains closed position, the switch 11 is automatically opened and the switch 9 automatically thrown, the parts being now again in their initial position as shown in Figs. 2, 5, 6, and 10.

Fig. 11 illustrates the position of the parts during the closing stroke of the shutter, shortly before its completion. Comparison with Figs. 5 and 10, which illustrate these parts positioned as just upon closing of the shutter, shows that as the closed shutter position is attained, switch 9 is returned to its initial position, and switch 11 is opened, having been closed during the shutter stroke.

The purpose of the switch 11 is to provide that the shutter will come to rest in the position desired by the operator, though the operator may shift his switch 8 after commencement of an adjusting stroke of the shutter but before completion of such stroke. Were it not for the switch 11 the motor would stop under such circumstances leaving the shutter in an intermediate position. By virtue of the switch 11, should the operator shift his switch 8 during an adjusting stroke of the shutter, the motor 4 will continue in operation through the end of such shutter stroke and ultimately bring the shutter to open or closed position corresponding with the final setting of the switch 8.

To indicate to the operator the attainment by the shutter of the position indicated by the switch 8, a signal light 12 of neon or other high resistance type, is provided on the control panel. The light may be preferably red and is connected by the shutter-open point on the switch 8 and the motor as indicated in Fig. 7, whereby the red light will show only when the shutter is in fully open position.

It is desirable that filters be selectively employed to modify characteristics of the beam A. For this purpose the invention includes a cylindrical frame having annular members 13a interconnected by longitudinally extending members 13b to define a cylinder extending about the emitting parts of the tube 1 and also about the shutter 3, the frame being mounted for adjustment about its cylindrical axis. A set of filter elements 13 is provided, each being mounted on the frame in one of the set of openings provided by the latter. One of these openings may be left without a filter element as indicated in Fig. 3, to provide for such occasion as may require no filtering effect. The arrangement is obviously such that by adjustment of the frame a selected filter element may be disposed to be effective upon the X-ray beam A.

For such selective adjustment of the frame and consequently of the filters, the frame is provided with a ring gear 13c, and a cooperative pinion 13d is arranged to be actuated by control knob 13e on the outside of the housing 2, the arrangement being such that rotation of the knob 13e will serve to place any of the filter elements 13 in effective position in the path of the beam A.

To indicate to the operator manipulating the knob 13e, the instant position of the set of filter elements, the housing 2 is provided with an opening 13f and the frame is provided with a number of tabs 13g, each bearing indicia identifying the adjacent filter element. The arrangement is such that when a filter element is properly positioned to be effective upon the beam A, its tab 13g will be in registry with the opening 13f and hence visible to the operator.

Means are arranged to provide a similar filter element identification to the operator at the remote control unit shown in Fig. 6. For this purpose a switch 14 is located adjacent the filter element frame, and a corresponding switch 15 on the remote control unit. The switch 14 has points each corresponding with one of the filter element openings in the filter element frame, and the switch 15 has corresponding points each connected with one of the points of the switch 14 as by one of the lines 18, as indicated in Fig. 7. The switch 14 is automatically set responsive to the position of the filter frame, as by means of a number of pins 16 which actuate a wheel follower 16a, the follower having controlling connection with the switch 14 as indicated in Fig. 7. The switch 15 has connection with the line $L_1$ by way of an adjacent signal light 17 which may be green, and the switch 14 has connection with the line $L_2$; and the switches being interconnected point for point by the lines 18, it will be apparent that when the switch 15 is shifted to its point corresponding with the point occupied by the switch 14, the signal light 17 will be energized. The face of the remote control unit being calibrated as indicated in Fig. 6, to correspond with the set of filter elements at the X-ray tube, it will be apparent that the operator at the remote control unit, by adjusting his switch 15 while observing the lamp 17, may apprise himself of which filter element is in operative position at the X-ray tube.

What we claim is:

1. X-ray apparatus comprising a shutter mounted adjacent an X-ray tube for movement between a closed position for intercepting a beam of X-rays from said tube and an open nonintercepting position, motor means for moving said shutter between said positions, control means for said motor means and including a remotely located operator-operable switch for energizing said motor means, and a switch for automatically deenergizing said motor means upon completion of shutter movement to either of said positions, and signal means for indicating to the operator at said energizing switch, attainment by said shutter of one of said positions responsive to the setting of said energizing switch.

2. X-ray apparatus comprising a shutter mounted for movement longitudinal of an X-ray tube between a closed position in a path of the X-ray beam from said tube and an open position out of said path, and means for so moving said shutter and comprising a crank element, means providing reciprocating actuation of said shutter between said positions by rotation of said crank element, motor means for unidirectional drive of said crank element, control means for said motor means and including a remotely located operator-operable switch for energizing said motor means and a switch for automatically deenergizing said motor means upon completion of shutter movement to either of said positions, and signal means for indicating to the operator at said energizing switch, attainment by said shutter of a position responsive to the setting of said energizing switch.

3. X-ray apparatus comprising a shutter mounted for movement longitudinal of an X-ray tube between a position closing a path of X-ray emission from said tube and an open position not obstructing said path, and means for so moving said shutter and comprising a crank element, means providing reciprocating actuation of said shutter between said positions by rotation of said crank element, motor means for unidirectional drive of said crank element, and control means for said motor means and including operator-controlled switch means for energizing said motor means located remotely from said tube, and switch means for deenergizing said motor means automatically upon movement of said shutter to one of said positions and means for actuation of said deenergizing switch responsive to attainment by said shutter of said position.

4. X-ray apparatus comprising a shutter mounted for movement longitudinal of an X-ray tube between a closed position in the path of an X-ray beam from said tube and an open position out of said path, and means for so moving said shutter and comprising a crank element, means providing reciprocating actuation of said shutter between said positions by rotation of said crank element, motor means for unidirectional drive of said crank element, and control means for said motor and including an operator-operable switch having a pair of selective positions corresponding to open and closed shutter positions, an automatic switch having a corresponding pair of selective positions, means responsive to the position of said shutter for throwing said automatic switch from one of its positions to the other responsive to attainment by said shutter of one of its said positions from the other, circuit means interconnecting said motor and switches to provide energization of said motor responsive to said operator-operable switch and deenergization of said motor by said automatic switch and including a pair of branches between said switches, and means providing attainment by said shutter of a position responsive to a second setting of said operator-operable switch notwithstanding initial energization of said motor consequent upon a first and different setting of said operator-operable switch.

5. X-ray apparatus comprising a shutter mounted for movement longitudinal of an X-ray tube between a closed position in the path of an X-ray beam from said tube and an open position out of said path, and means for so moving said shutter and comprising a crank element, means providing reciprocating actuation of said shutter between said positions by rotation of said crank element, motor means for unidirectional drive of said crank element, and control means for said motor and including an operator-operable switch having a pair of selective positions corresponding to open and closed shutter positions, an automatic switch having a corresponding pair of selective positions, means responsive to the position of said shutter for throwing said automatic switch from one of its positions to the other responsive to attainment by said shutter of one of its said positions from the other, circuit means interconnecting said motor and switches to provide energization of said motor responsive to said operator-operable switch and deenergization of said motor by said automatic switch and including a pair of branches between said switches, a third switch arranged to interconnect said connections, and means providing actuation of said third switch responsive to the position of said shutter to provide said interconnection between said branches when said shutter is in intermediate positions.

6. A cylindrical filter frame extending about an X-ray tube, a set of filter elements mounted on said frame in a circumferentially extending series, and a housing for said tube having a window disposed in the path of a beam of X-rays emitted from said tube, said frame being mounted for adjustment about its axis to permit selective registration of said filter elements with said window.

7. A circular filter frame extending about an X-ray tube, a set of filter elements mounted on said frame in a circumferentially extending series, a housing for said tube having a window disposed in the path of a beam of X-rays emitted from said tube, said frame being mounted for adjustment about its axis to permit selective registration of said filter elements with said window, and means providing for said adjustment and including an operator-operable member located outside said housing.

8. A circular filter frame extending about an X-ray tube, a set of filter elements mounted on said frame in a circumferentially extending series, a housing for said tube having a window disposed in the path of a beam of X-rays emitted from said tube, said frame being mounted for adjustment about its axis to permit selective registration of said filter elements with said window, and means providing for said adjustment and including an operator-operable member located outside said housing, a ring gear on said filter frame, and cooperative pinion means controlled by said operator-operable member.

9. A circular filter frame extending about an X-ray tube, a set of filter elements mounted on said frame in a circumferentially extending series, a housing for said tube having a window disposed in the path of a beam of X-rays emitted from said tube, said frame being mounted for adjustment about its axis to permit selective registration of said filter elements with said window, said housing having an opening spaced from said window and said frame bearing indicia corresponding to said filter elements and located to be visible through said opening to identify such element as may be in registry with said window.

10. In apparatus having an X-ray tube arranged to emit a beam of X-rays, a set of filter elements disposed to define a cylinder about said tube, means for adjusting said set about its cylindrical axis to dispose a selected one of said elements in intersecting relation with said beam, a shutter, and means for moving said shutter in a path extending longitudinal of said tube and within said cylinder between a closed position intercepting said beam and an open nonintercepting position.

CAPERTON B. HORSLEY.
EDWIN R. GOLDFIELD.